(12) United States Patent
Makino (10) Patent No.: US 8,522,075 B2
(45) Date of Patent: Aug. 27, 2013

(54) STORAGE SYSTEM HAVING STORAGE DEVICES FOR STORING DATA AND CONTROL DEVICES FOR CONTROLLING THE STORAGE DEVICES

(75) Inventor: Tomoya Makino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 802 days.

(21) Appl. No.: 12/269,227

(22) Filed: Nov. 12, 2008

(65) Prior Publication Data

US 2009/0132866 A1    May 21, 2009

(30) Foreign Application Priority Data

Nov. 21, 2007   (JP) ................................. 2007-301651

(51) Int. Cl.
    *G06F 11/00*        (2006.01)
(52) U.S. Cl.
    USPC ............................................. 714/6.3; 714/43
(58) Field of Classification Search
    USPC ................. 714/4.1, 4.11, 4.12, 6.1, 6.13, 6.2,
         714/6.21–6.24, 6.3, 6.32, 42, 43, 56; 370/217
    See application file for complete search history.

(56) References Cited

U.S. PATENT DOCUMENTS

| | | | |
|---|---|---|---|
| 5,473,752 A * | 12/1995 | Beistle et al. .................... | 714/4.1 |
| 7,111,087 B2 * | 9/2006 | Jiang et al. ........................ | 710/36 |
| 7,234,023 B2 * | 6/2007 | Abe et al. ......................... | 711/114 |
| 2001/0014956 A1 | 8/2001 | Nagata et al. | |
| 2004/0236908 A1 | 11/2004 | Suzuki et al. | |
| 2005/0010843 A1 | 1/2005 | Iwamitsu et al. | |
| 2005/0022050 A1 | 1/2005 | Nagata et al. | |
| 2005/0223266 A1 | 10/2005 | Iwamitsu et al. | |
| 2006/0224734 A1 * | 10/2006 | Aono ............................. | 709/224 |
| 2007/0180293 A1 * | 8/2007 | Takahashi ......................... | 714/6 |
| 2007/0240014 A1 | 10/2007 | Nagata et al. | |
| 2007/0271481 A1 * | 11/2007 | Kawakami et al. ............... | 714/5 |

FOREIGN PATENT DOCUMENTS

| | | |
|---|---|---|
| JP | 2001-222385 | 8/2001 |
| JP | 3516689 | 1/2004 |
| JP | 2004-348876 | 12/2004 |
| JP | 2005-31928 | 2/2005 |
| WO | WO98/21660 | 5/1998 |

OTHER PUBLICATIONS

Japanese Office Action for corresponding Japanese application 2007-301651; issued Oct. 20, 2009.
Japanese Office Action for corresponding Japanese application 2007-301651; issued Oct. 20, 2009, Partial.

* cited by examiner

*Primary Examiner* — Scott Baderman
*Assistant Examiner* — Joseph Kudirka
(74) *Attorney, Agent, or Firm* — Staas & Halsey LLP (57) ABSTRACT

According to an aspect of an embodiment, a storage apparatus comprising; a pair of control devices for controlling storage devices, each control device being connected with another control device; storage devices for storing data; switches being connected with the plurality of storage devices, the switches being connected between the control devices in series; wherein the control device for controlling the plurality of switches according to a process including detecting a fault in the connection of the switches, and; controlling the control devices to access the storage devices via the switches such that one of the control devices accesses a part of the storage devices via a part of the switches located between the one of the control devices and the fault, and the other of the control devices accesses remainder of the storage devices via remainder of the switches, respectively.

9 Claims, 13 Drawing Sheets

| DEVICE IDENTIFICATION INFORMATION | ADDRESS |
|---|---|
| A | ○ ○ ○ ○ |
| B | × × × × |
| ⋮ | ⋮ |

STORAGE SYSTEM HAVING STORAGE DEVICES FOR STORING DATA AND CONTROL DEVICES FOR CONTROLLING THE STORAGE DEVICES

BACKGROUND

1. Technical Field

This technique generally relates to a storage system having storage devices for storing data and control devices for controlling the storage devices. More specifically, the present invention relates to a storage system that allows access to each storage device even if a failure occurs in a communication path and also allows efficient system recovery.

2. Description of the Related Art

In systems in recent years, data used by a computing apparatus for various types of processing are stored on multiple HDDs (hard disk drives) included in a RAID (Redundant Arrays of Inexpensive Disks) to speed up the data access and improve the security of the data (e.g., refer to Japanese Laid-open Patent Application Publication No. 2004-348876 and Japanese Patent No. 3516689). The RAID apparatus typically has an arbitrated loop constituted by multiple DEs (disk enclosures) and high-order RAID controllers.

Figure 12:
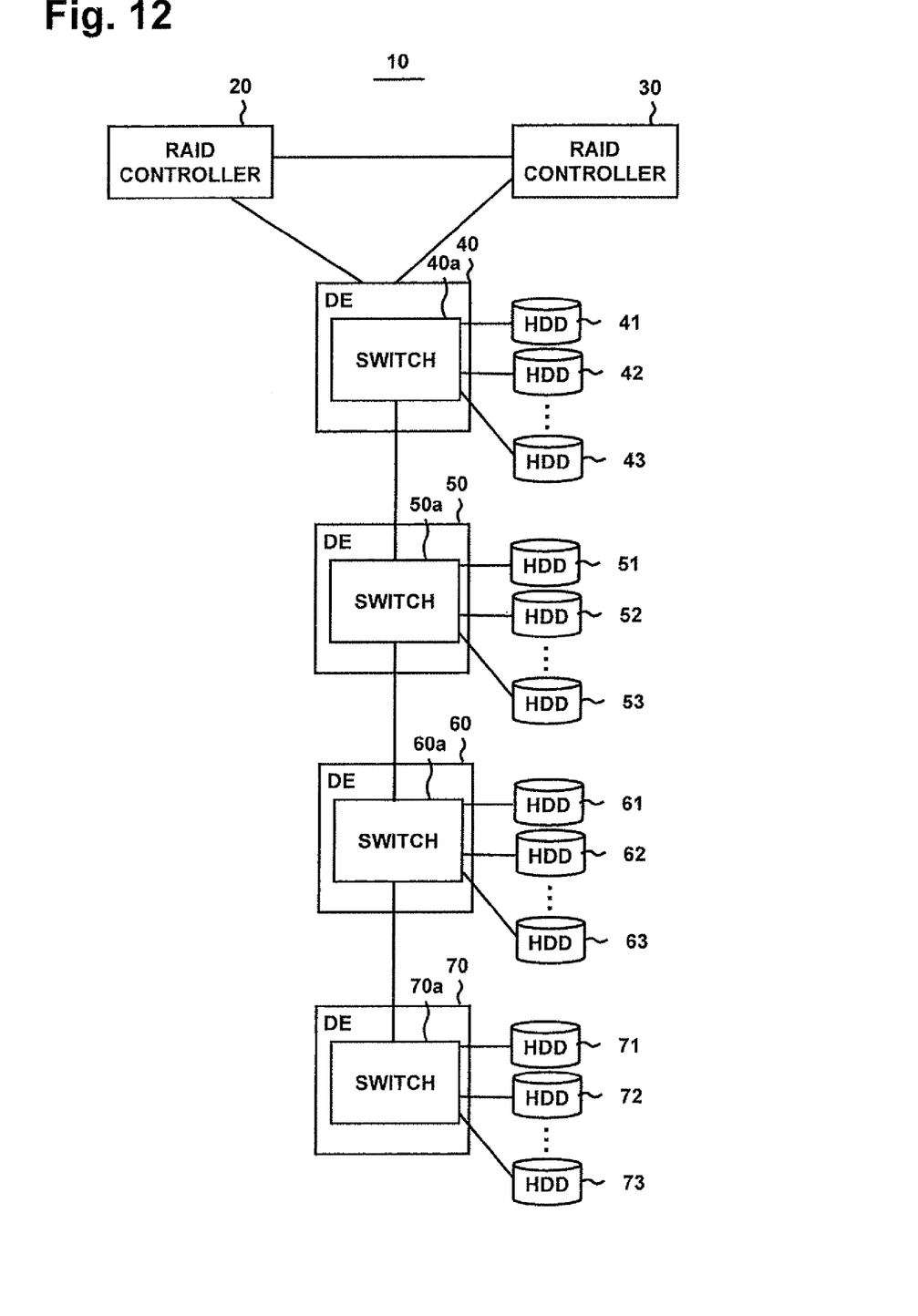
FIG. 12 is a block diagram showing the configuration of a known RAID apparatus.

FIG. 12 is a block diagram of the configuration of a known RAID apparatus. As shown, a RAID apparatus 10 includes RAID controllers 20 and 30 and DEs 40 to 70. Each device is assigned a unique address called an "ALPA (arbitrated loop physical address)".

For example, upon obtaining data to be stored from a computing apparatus (not shown), each of the RAID controllers 20 and 30 executes processing for allocating the obtained data to the DEs 40 to 70. Also, for example, in response to a data obtaining request from the computing apparatus, each of the RAID controllers 20 and 30 executes processing for obtaining the requested data from the DEs 40 to 70.

Each of the DEs 40 to 70 has a switch and is connected to multiple HDDs via the switch. For example, the DE 40 has a switch 40a and is connected to HDDs 41 to 43 via the switch 40a. Typically, cables are used to interconnect the DEs 40 and 70 in consideration of future expansion. The connection is generally accomplished by a cascade connection, which is also known as a concatenated connection.

However, the above-described known technology has a problem in that, when a failure such as a cable defect or a unit defect occurs in a communication path that reaches from the RAID controller to the DEs, the DE(s) subsequent to the failed DE becomes unusable.

Figure 13:
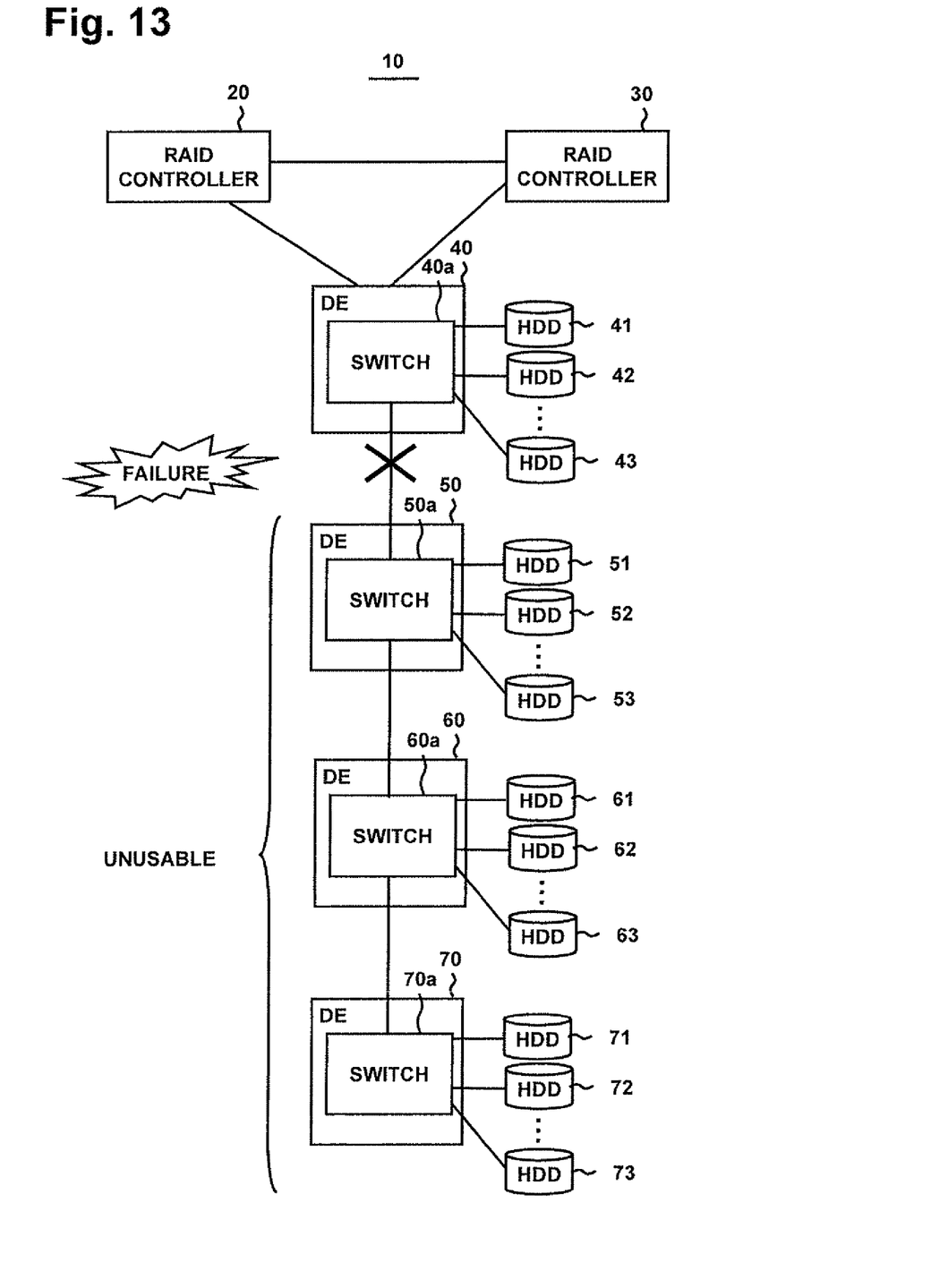
FIG. 13 is a block diagram illustrating a problem of the known technology.

FIG. 13 is a block diagram illustrating the problem of the known technology. For example, as shown in FIG. 13, when a failure occurs in the communication path between the DE 40 and the DE 50, the RAID controllers 20 and 30 cannot access the DEs 50 to 70. Also, when a failure occurs in the DE that is located adjacent to the RAID controller 20 and 30, the number of DEs that become unusable increases and the availability decreases significantly.

Although it is possible to provide the structure with a redundancy by duplicating cables between the DEs, the cable cost is inevitably doubled and an increased number of cables complicates the installation of the cables.

In addition, when a cable defect, a unit defect or the like occurs, any of the DEs 40 to 70 detects the fault without automatic isolation, the DEs 40 to 70 are then temporarily stopped, a portion in question is identified on the basis of history data and so on, and component replacement is performed to resume the operation. Such a procedure delays the recovery of the RAID apparatus and reduces the availability.

That is, the known technology has critical challenges to enabling access to the storage devices (i.e., HDDs) connected to each DE and enabling efficient recovery of the RAID apparatus, even if a failure occurs in a communication path in the RAID apparatus.

SUMMARY

According to an aspect of an embodiment, a storage apparatus comprising; a plurality of storage devices for storing data; a pair of control devices for controlling the plurality of storage devices, each control device being connected with another control device; a plurality of switches for relaying data between the control device and storage devices and being connected with the plurality of storage devices, the plurality of switches being connected between the control devices in series; wherein the each of the control devices for controlling the plurality of storage devices according to a process comprising the steps of: detecting a fault in the connection between the control devices and the switches, and; controlling the access to the storage devices via the switches such that one of the control devices accesses a part of the storage devices via the switches located between said one of the control devices and the fault, and the other of the control devices accesses remainder of the storage devices via remainder of the switches, respectively.

DESCRIPTION OF THE PREFERRED EMBODIMENTS

Embodiments will be described below in detail with reference to the accompanying drawings, First Embodiment An overview and features of a RAID apparatus (a storage system) according to a first embodiment of the present invention will be described first.

Figure 1:
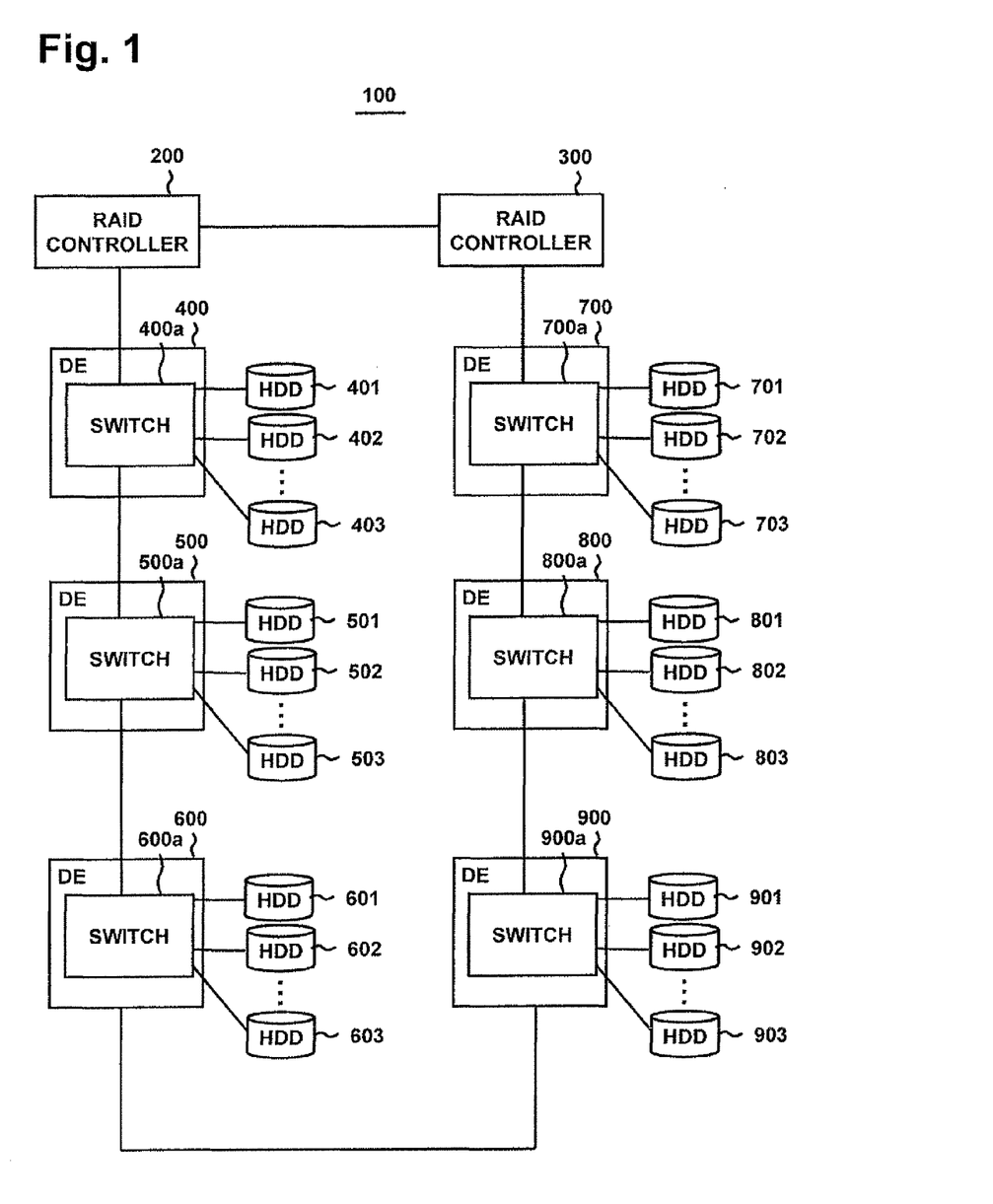
FIG. 1 is a block diagram illustrating an overview and features of a RAID apparatus according to a first embodiment of the present invention.
Figure 2:
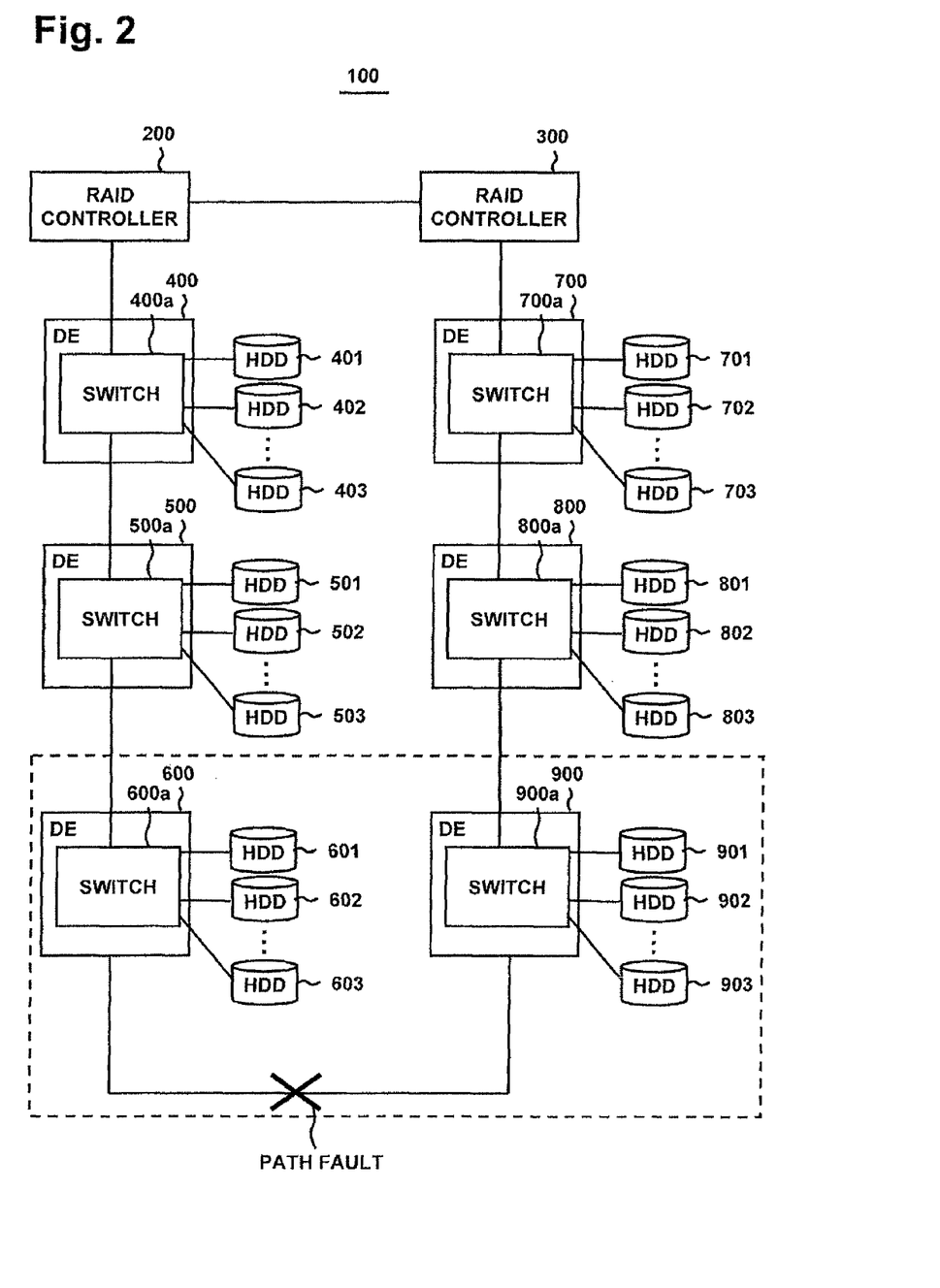
FIG. 2 is a block diagram illustrating an overview and features of the RAID apparatus according to the first embodiment.

FIGS. 1 and 2 are diagrams illustrating an overview and features of a RAID apparatus according to a first embodiment of the present invention. As shown, this RAID apparatus 100 includes RAID controllers 200 and 300 and disk enclosures (DEs) 400 to 900. The RAID controllers 200 and 300 control the DEs 400 to 900 and are also connected to a host computer (not shown) or the like. The RAID controllers 200 and 300 and the DEs 400 and 900 are connected in a loop.

Each of the DEs 400 to 900 has HDDs for storing various types of information and a switch for executing frame transfer in accordance with the transmission destination of frames transmitted from the RAID controller 200 or 300. The HDDs are connected to the corresponding switch. During normal operation, one or some of the HDDs are kept in only a standby mode without storing data (such a HDD is referred to as a "standby HDD" herein). For example, the DE 400 has a switch 400a, which is connected to HDDs 401 to 403, and the HOD 403 serves as a standby HDD, Although the HDDs 401 to 403 are illustrated for convenience of description, the DE 400 may have other HDDs. The same applies to the DEs 500 to 900.

As shown in FIG. 1, with the configuration of the RAID apparatus 100, even if a fault occurs in a path, it is possible to access the DE(s) connected beyond the path where the fault occurs.

For example, as shown in FIG. 2, when the RAID controller 200 accesses the DE 900 via the DEs 400, 500, and 600 and a path fault occurs between the DE 600 and the DE 900, the RAID controller 200 accesses the DE 900 via the RAID controller 300 and the DEs 700 and 800. In other words, the RAID controller 200 instructs the RAID controller 300 to access the DE 900 and the DEs 700 and 800.

In the RAID apparatus 100 according to the first embodiment, when a path fault occurs between the DE 600 and the DE 900, there is also a possibility that a failure is occurring in any of the DEs 600 and 900 and thus the DEs 600 and 900 between which the path where the fault occurred is connected are isolated from the RAID apparatus 100. This enhances the overall reliability of the RAID apparatus 100. The isolated DEs transfer data, stored on the local HDDs, to the local standby HDDs. For example, when the DE to be isolated is the DE 400, the DE 400 transfers data, stored on the HDDs 401 and 402, to the HDD 403 that serves as a standby HOD.

The RAID controllers 200 and 300 according to the first embodiment will now be described. Since the configurations of the RAID controllers 200 and 300 are the same, a description for the RAID controller 200 is given below and a description for the RAID controller 300 is omitted.

Figure 3:
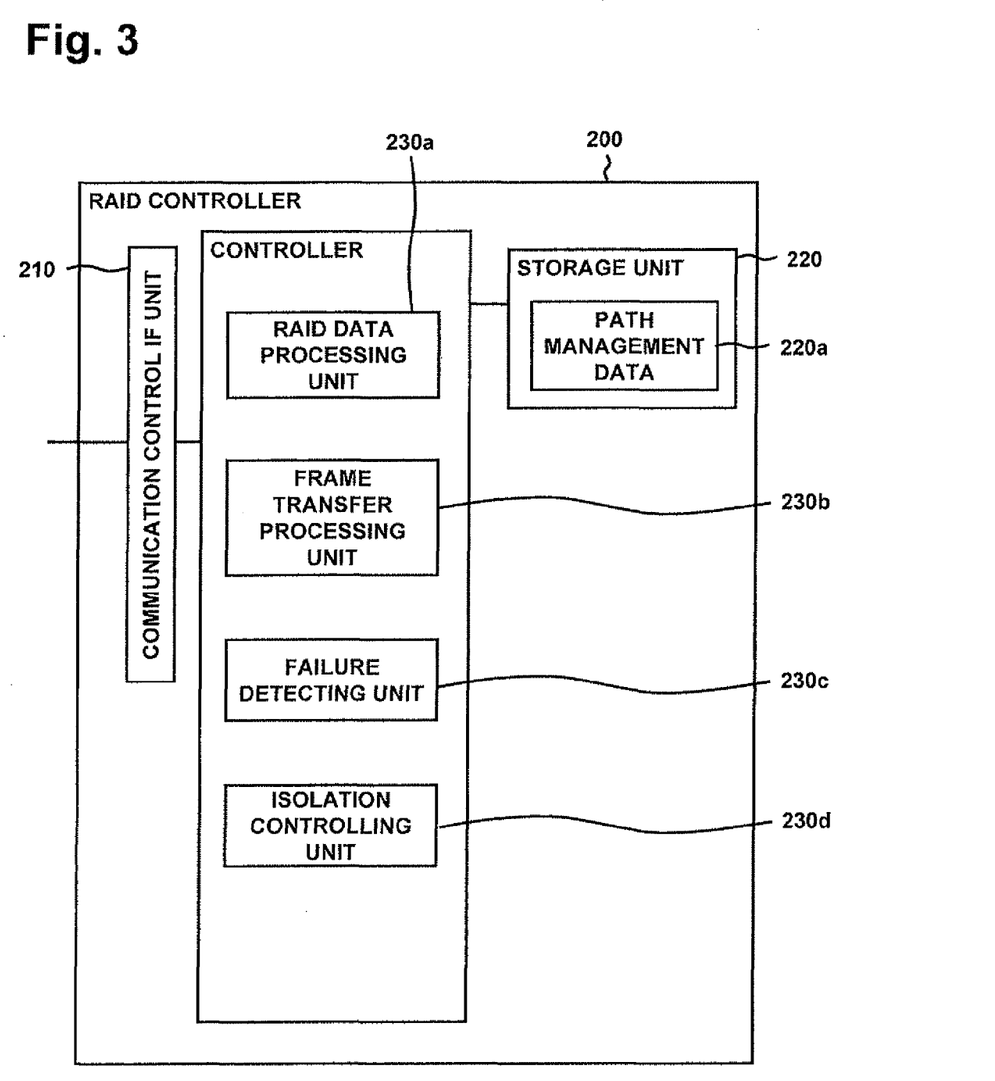
FIG. 3 is a functional block diagram showing the configuration of a RAID controller according to the first embodiment.

FIG. 3 is a functional block diagram showing the configuration of the RAID controller 200 according to the first embodiment. As shown, the RAID controller 200 includes a communication control interface (IF) unit 210, a storage unit 220, and a control unit 230.

The communication control interface unit 210 serves as a processing unit for controlling data communication (such as frame transmission/reception) executed with an external device. The storage unit 220 serves storing data and a program required for various types of processing performed by the control unit 230. As shown in FIG. 3, the storage unit 220 stores path management data 220a according to the present invention.

Figure 4:
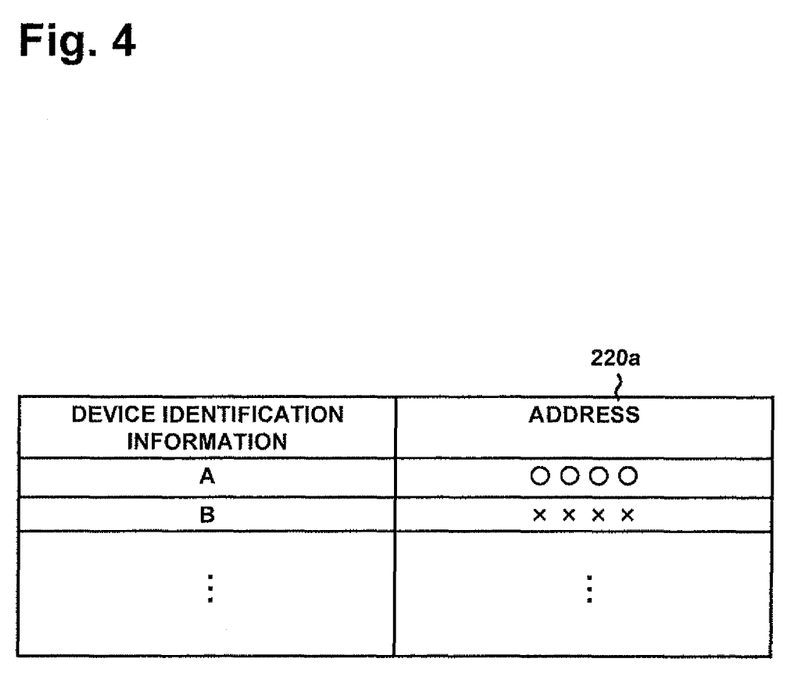
FIG. 4 is a table showing one example of the data structure of path management data.

FIG. 4 is a table showing one example of the data structure of the path management data 220a. As shown, the path management data 220a contain device identification information (on the devices, such as DEs 400 to 900) and addresses corresponding to the respective devices, the device identification information and the addresses being associated with each other. These addresses include path information (such as information on ports for outputting frames).

The control unit 230 has an internal memory for storing control data and a program that specifies various processing procedures, and serves executing various types of processing by using the control data and the program. As shown in FIG. 3, the control unit 230 includes a RAID data processing unit 230a, a frame transfer processing unit 230b, a failure detecting unit 230c, and an isolation controlling unit 230d according to the present invention.

The RAID data processing unit 230a provides a response to a data storing/reading request or the like sent from the host computer. In particular, upon obtaining data to be stored in any of the DEs 400 to 900 from the host computer, the RAID data processing unit 230a according to the first embodiment generates RAID data from the obtained data to be stored The RAID data contains data in which the data to be stored and the transmission destination of the data to be stored are associated with each other, parity data, and so on (the transmission destination is indicated by identification information of the HDDs of the DE in which the data are to be stored).

The frame transfer processing unit 230b executes typical frame transfer. In particular, upon receiving the RAID data from the RAID data processing unit 230a, the frame transfer processing unit 230b according to the first embodiment determines an address by comparing the transmission destination contained in the obtained RAID data with the path management data 220a and outputs a frame containing the determined address and the PAID data to the communication control interface unit 210.

The failure detecting unit 230c serves as a processing unit for detecting a failure that occurs in a path in the RAID apparatus 100. For example, upon obtaining information (path-fault detection information) indicating that a path fault is detected from the DE 600 and/or the DE 900, the failure detecting unit 230c determines that a fault has occurred in the path that interconnects the DE 600 and the DE 900 and outputs the result of the determination to the isolation controlling unit 230d.

Upon obtaining the determination result from the failure detecting unit 230c, the isolation controlling unit 230d serves as a processing unit for executing processing for updating the path management data 220a, processing for transferring data, and processing for DE isolation, on the basis of the determination result. The processing for updating the path management data 220a, the processing for transferring data, and the processing for DE isolation, which are executed by the isolation controlling unit 230d, will be described below in that order.

Processing for Updating Path Management Data

On the basis of the determination result, the isolation controlling unit 230d updates addresses associated with the respective DEs 400 to 900 to addresses that do not pass through the failed portion. For example, when a path for an address associated with the DE 900 reaches the DE 900 via the DEs 400, 500, and 600 and a failure occurs in a path between the DE 600 and the DE 900, the isolation controlling unit 230d updates, in the path management data 220a, the address associated with the DE 900 to an address that reaches the DE 900 via the RAID controller 300 and the DEs 700 and 800.

Processing for Transferring Data

On the basis of the determination result, the isolation controlling unit 230d identifies DEs between which the path where the path fault occurred is connected. The isolation controlling unit 230d then outputs information (data-transfer execution information) indicating data-transfer execution to the identified DEs. For example, when a path fault occurs between the DE 600 and the DE 900, the isolation controlling unit 230d outputs the data-transfer execution information to the DEs 600 and 900.

Processing for DE Isolation

On the basis of the determination result, the isolation controlling unit 230d executes the DE isolation. For example, when a path failure occurs between the DE 600 and the DE 900, the isolation controlling unit 230d isolates, from the RAID apparatus 100, the DEs 600 and 900 between which the failed path is connected (e.g., may delete addresses associated with the DEs 600 and 900 from the path management data 220a, or may set flags indicating the isolation along with the identification information of the DEs 600 and 900).

A description is now given of the switches 400a to 900a accommodated in the corresponding DEs 400 to 900. For convenience of description, a description for the switch 400a is given below and a description for the switches 500a to 900a is omitted, since the configuration of the switches 500a to 900a is the same as the configuration of the switch 400a.

Figure 5:
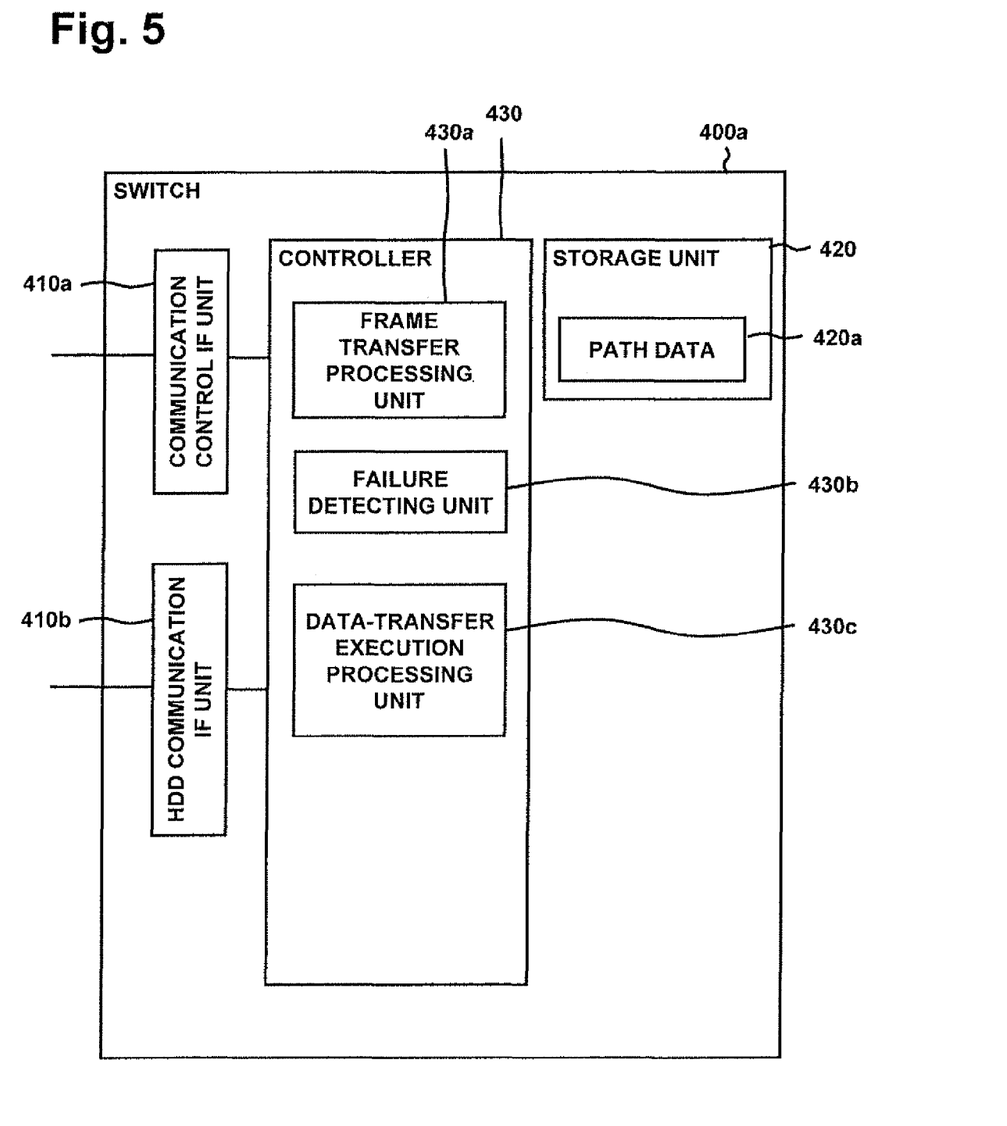
FIG. 5 is a functional block diagram showing the configuration of a switch according to the first embodiment.

FIG. 5 is a functional block diagram showing the configuration of the switch 400a according to the first embodiment. As shown, the switch 400a includes a communication control interface (IF) unit 410a, a HDD communication interface (IF) unit 410b, a storage unit 420, and a control unit 430.

The communication control interface unit 410a serves as a processing unit for controlling data communication (such as frame transmission/reception) with another DE or the RAID controller 200 or 300. The HDD communication interface unit 410b serves as a processing unit for controlling data communication with the HDDs 401 to 403 connected to the switch 400a.

The storage unit 420 serves storing data and a program required for various types of processing performed by the control unit 430. As shown in FIG. 5, the storage unit 420 has path data 420a according to the present invention. The path data 420a contains the transmission destination of frames and output destinations thereof in association with each other.

The control unit 430 has an internal memory for storing control data and a program that specifies various processing procedures, and serves executing various types of processing by using the control data and the program. As shown in FIG. 5, the control unit 430 includes a frame transfer processing unit 430a, a failure detecting unit 430b, and a data-transfer execution processing unit 430c according to the present invention.

Upon receiving a frame, the frame transfer processing unit 430a determines the output destination of the frame by comparing the transmission destination of the frame with the path data 420a and outputs the frame on the basis of the result of the determination.

The failure detecting unit 430b serves as a processing unit for detecting a path fault by executing data communication with another DE. Upon detecting a path fault, the failure detecting unit 430b outputs path-fault detection information to the RAID controller 200 or 300. The failure detecting unit 430b detects the path fault by monitoring an input-signal voltage or a transmission-path error.

Figure 6:
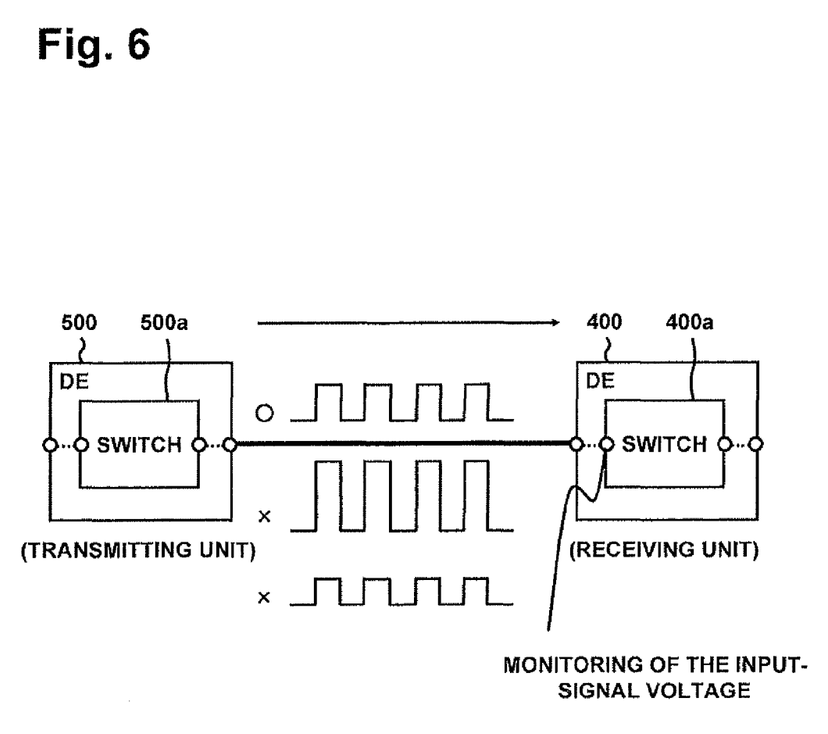
FIG. 6 is a diagram illustrating path-fault detection through monitoring an input-signal voltage.

FIG. 6 is a diagram illustrating path-fault detection through monitoring of the input-signal voltage. The failure detecting unit 430b pre-stores a threshold for the input voltage, and detects a path fault by comparing the threshold with the input-signal voltage. That is, as shown in FIG. 6, when the input voltage exceeds the threshold or falls below the threshold, the failure detecting unit 430b determines that a path fault has occurred.

It is now assumed that a signal transmitting unit is the DE 500 and a signal receiving unit is the DE 400. When the failure detecting unit 430b in the receiving unit detects a path fault, it is highly likely that a fault has occurred in any of the transmitting unit, the receiving unit, and the path cable between the transmitting unit and the receiving unit, and thus, three elements that consist of the transmitting unit, the receiving unit, and the path cable become elements to be isolated.

Figure 7:
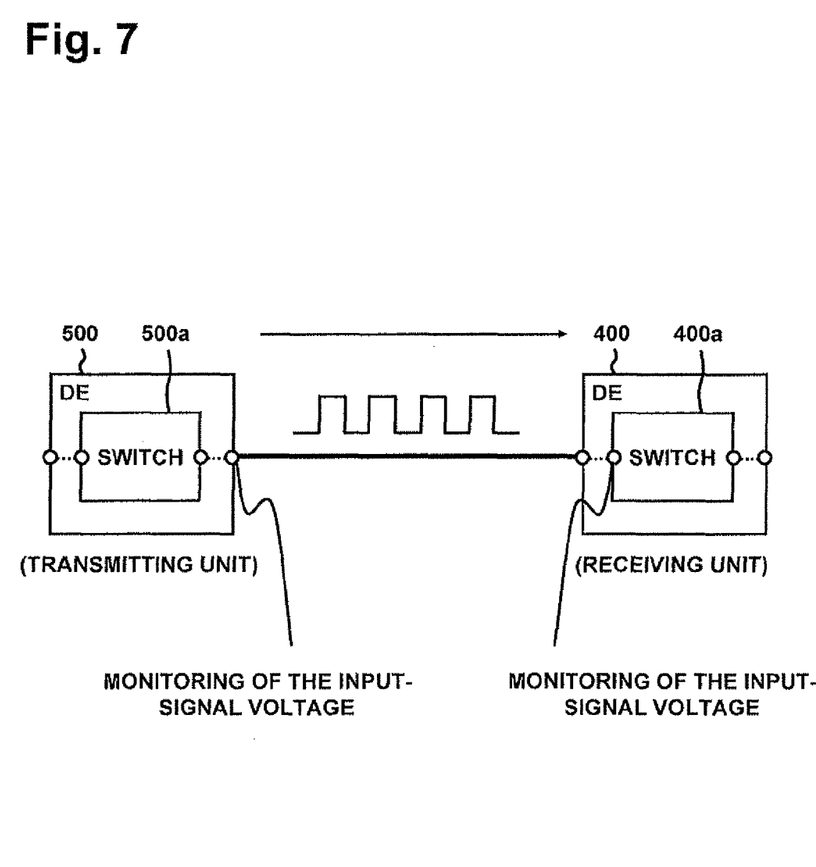
FIG. 7 is a diagram illustrating path-fault detection through monitoring of a transmission-path error.

FIG. 7 is a diagram illustrating path-fault detection through monitoring of the transmission-path error. The failure detecting unit 430b checks consistency of transferred data by using a scheme, such as CRC (cyclic redundancy check), during transmission and reception of data such as frame data. When the transferred data lacks consistency, the failure detecting unit 430b determines that a path fault has occurred.

A transmission error rate is defined for serial data transfer, and when errors occur more frequently than the transfer error rate, it is considered that some hardware failure is occurring. Referring to FIG. 7, when the transmitting unit (e.g., the DE 500) detects an error during transmission, a portion in question can be limited to the transmitting unit. However, when the receiving unit (e.g., the DE 400) detects an error, a portion in question cannot be identified and thus three elements that consist of the transmitting unit, the receiving unit, and the path cable therebetween become elements to be isolated.

Referring back to FIG. 5, upon obtaining the data-transfer execution information from the RAID controller 200 or 300, the data-transfer execution processing unit 430c transfers data stored on the HDDs to the standby HDD(s).

For example, when data to be transferred are stored on the HDDs 401 and 402 and the HDD 403 is a standby HOD, the data-transfer execution processing unit 430c transfers the data stored on the HDDs 401 and 402 to the HDD 403. After the completion of the data transfer, the data-transfer execution processing unit 430c outputs information indicating that the data transfer is completed to the RAID controller 200 or 300.

Figure 8:
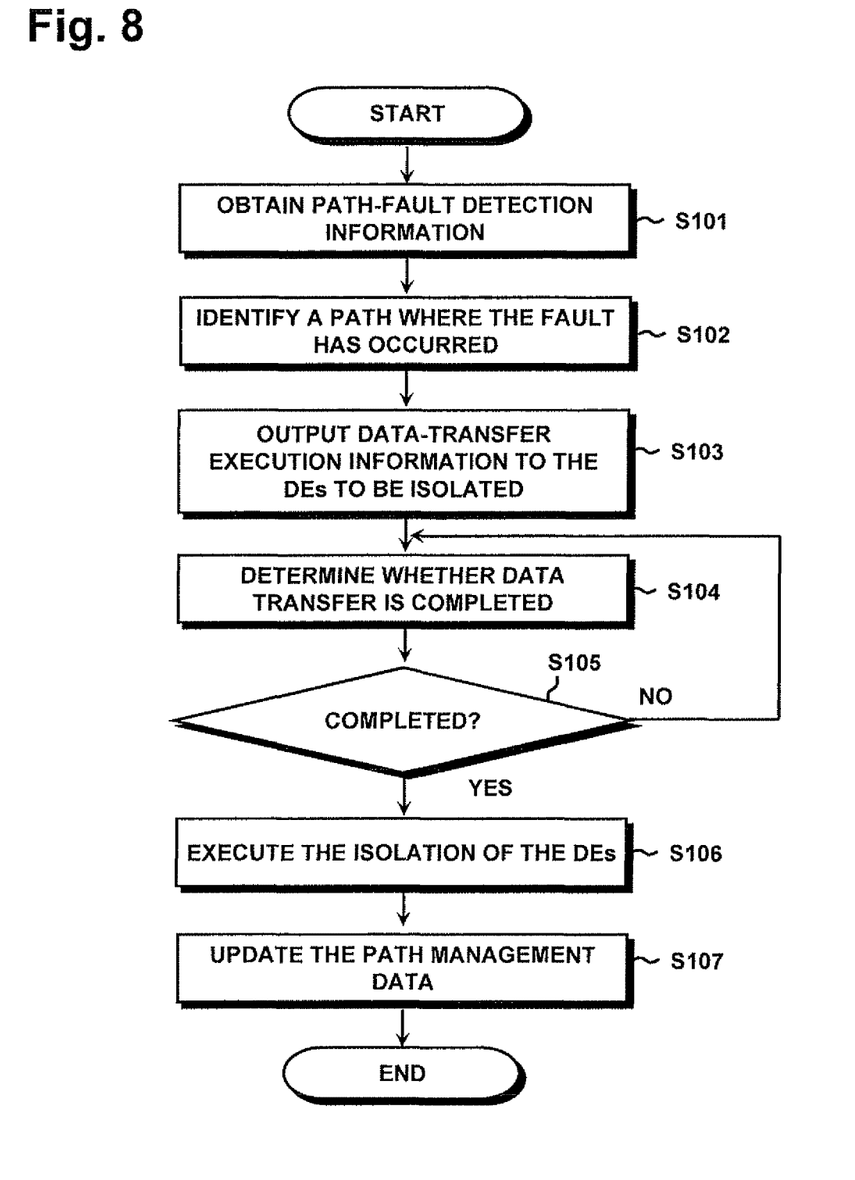
FIG. 8 is a flowchart showing a processing procedure for the RAID controller according to the first embodiment.

A description will now be given of a processing procedure for the RAID controller 200 according to the first embodiment. FIG. 8 is a flowchart showing a processing procedure for the RAID controller 200 according to the first embodiment. As shown, in operation S101, the RAID controller 200 obtains path-fault detection information from the DE that has detected a path fault. In operation S102, the RAID controller 200 identifies a path where the fault has occurred.

Subsequently, in operation S103, the RAID controller 200 outputs data-transfer execution information to the DEs to be isolated. As described above, the DEs to be isolated are the DEs between which the path where the failure was detected is connected. For example, when a failure occurs in the path between the DE 600 and the DE 900, the RAID controller 200 outputs the data-transfer execution information to the DEs 600 and 900.

Thereafter, in operation S104, the RAID controller 200 determines whether or not data transfer is completed. When the data transfer is not completed (No in operation S105), the processing in operation S104 is repeated after a predetermined time passes.

On the other hand, when the data transfer is completed (Yes in operation S105), the RAID controller 200 executes the isolation of the DEs in operation S106 and updates the path management data 220a in operation S107.

In this manner, since the RAID controller 200 updates the path management data 220a upon detecting a path fault, it is possible to access the DE(s) connected beyond the failed path. While the description has been omitted above, the processing procedure for the RAID apparatus 300 is analogous to the processing procedure shown in FIG. 8.

As described above, in the RAID apparatus 100 according to the first embodiment, the RAID controllers 200 and 300 are interconnected and the RAID controllers 200 and 300 and the DEs 400 to 900 are connected in a loop. Further, Upon detecting a path fault in the paths that reach the DEs 400 to 900, the RAID controller 200 or 300 switches paths that reach the DEs 400 to 900 (and updates the path management data 220a), on the basis of the detection result. Thus, even if a path fault occurs, it is possible to access the DE(s) connected beyond the path where the fault occurs and it is possible to efficiently recover the system.

In addition, according to the present invention, when a path fault is detected, not only the path cable from which the fault is detected but also the DEs connected to the path cable are isolated from the RAID apparatus 100. Thus, it is possible to improve the overall reliability of the RAID apparatus 100.

Additionally, since data stored in the DEs to be isolated are transferred to the standby HDD, the RAID apparatus 100 according to the first embodiment can ensure the security of the data stored in the DEs to be isolated.

Second Embodiment

While a particular embodiment of the present invention has been described above, the present invention may be implemented in various forms other than the above-described first embodiment. Accordingly, another embodiment according to the present invention will be described below as a second embodiment.

(1) Data Transfer Destination

For example, although the above-described first embodiment has been given of a case in which data stored on the HDDs (i.e., the HDDs in which data to be transferred are stored) are transferred to the local standby HDDs of the DEs when the DEs are to be isolated, the present invention is not limited thereto. For example, when the RAID apparatus 100 is a small-scale apparatus, only the use of the standby HDD that belongs to the same DE to which the HDDs to be isolated are connected may run out of free space on the standby HDD.

Figure 9:
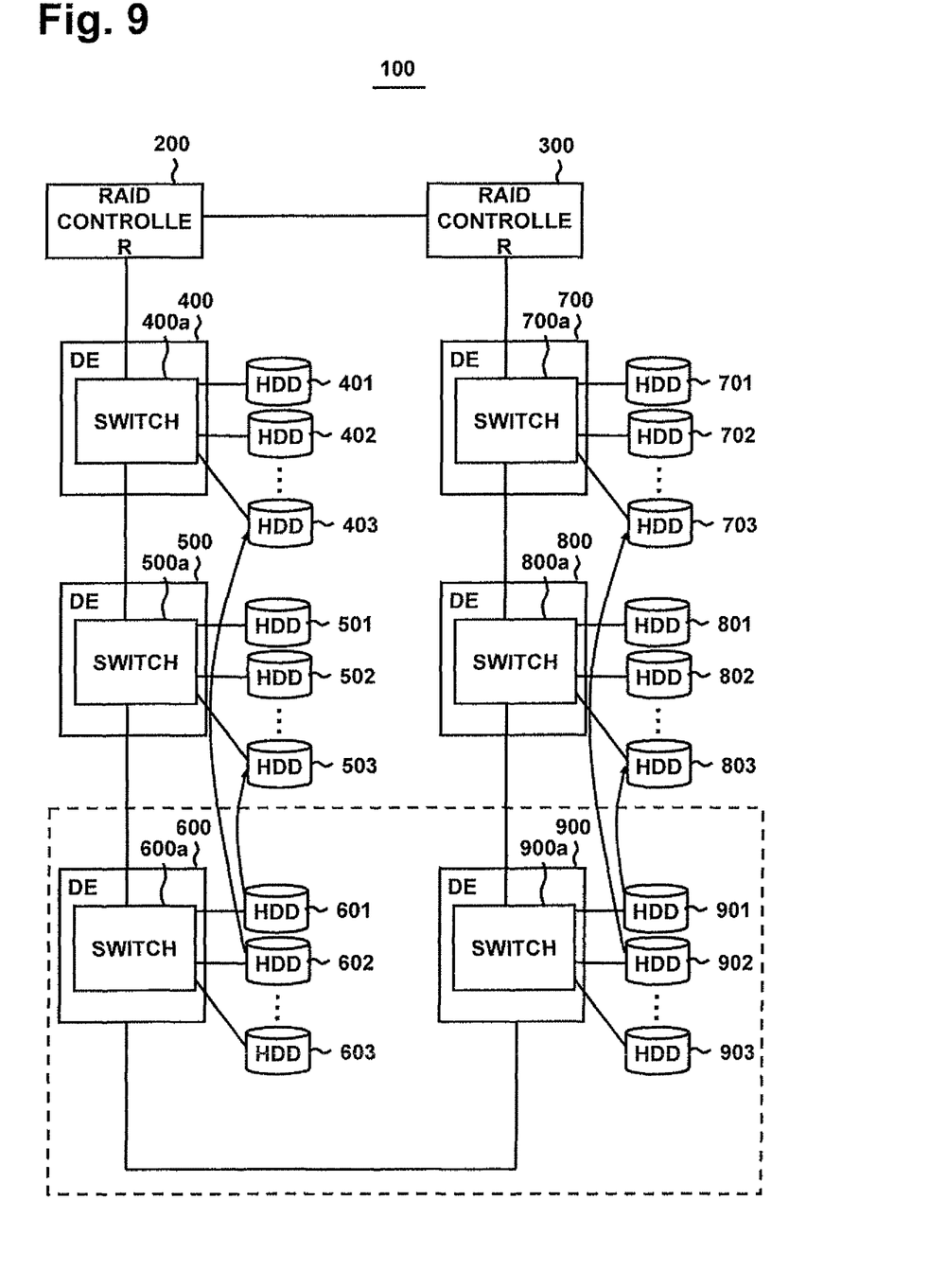
FIG. 9 is a block diagram illustrating another example of data-transfer destinations.

FIG. 9 is a block diagram illustrating another example of data-transfer destinations. As shown, when the standby HDDs of the DEs to be isolated run out of the free spaces, the RAID controller 200 or 300 transfers data to the standby HDDs of other DEs. For example, when the DEs to be isolated are the DEs 600 and 900 and the free spaces on the standby HDDs 603 and 903 of the DEs 600 and 900 run out, data stored on the HDDs 601 and 602 of the DE 600 are transferred to the standby HDDs 403 and 503 of the DEs 400 and 500 and data stored on the HDDs 901 and 902 of the DE 900 are transferred to the standby HDDs 703 and 803 of the DEs 700 and 800.

In this manner, since the data in the DEs to be isolated are transferred to the standby HDDs of other DEs (i.e., the DEs that are not to be isolated), it is possible to ensure the security of the data stored in the DEs to be isolated. In this case, the RAID controllers 200 and 300 hold information regarding the free spaces on the standby HDDs of the DEs 400 to 900 and thus can transfer the data to the DEs 400 to 900 by using the information.

(2) Path for Data Transfer

Figure 10:
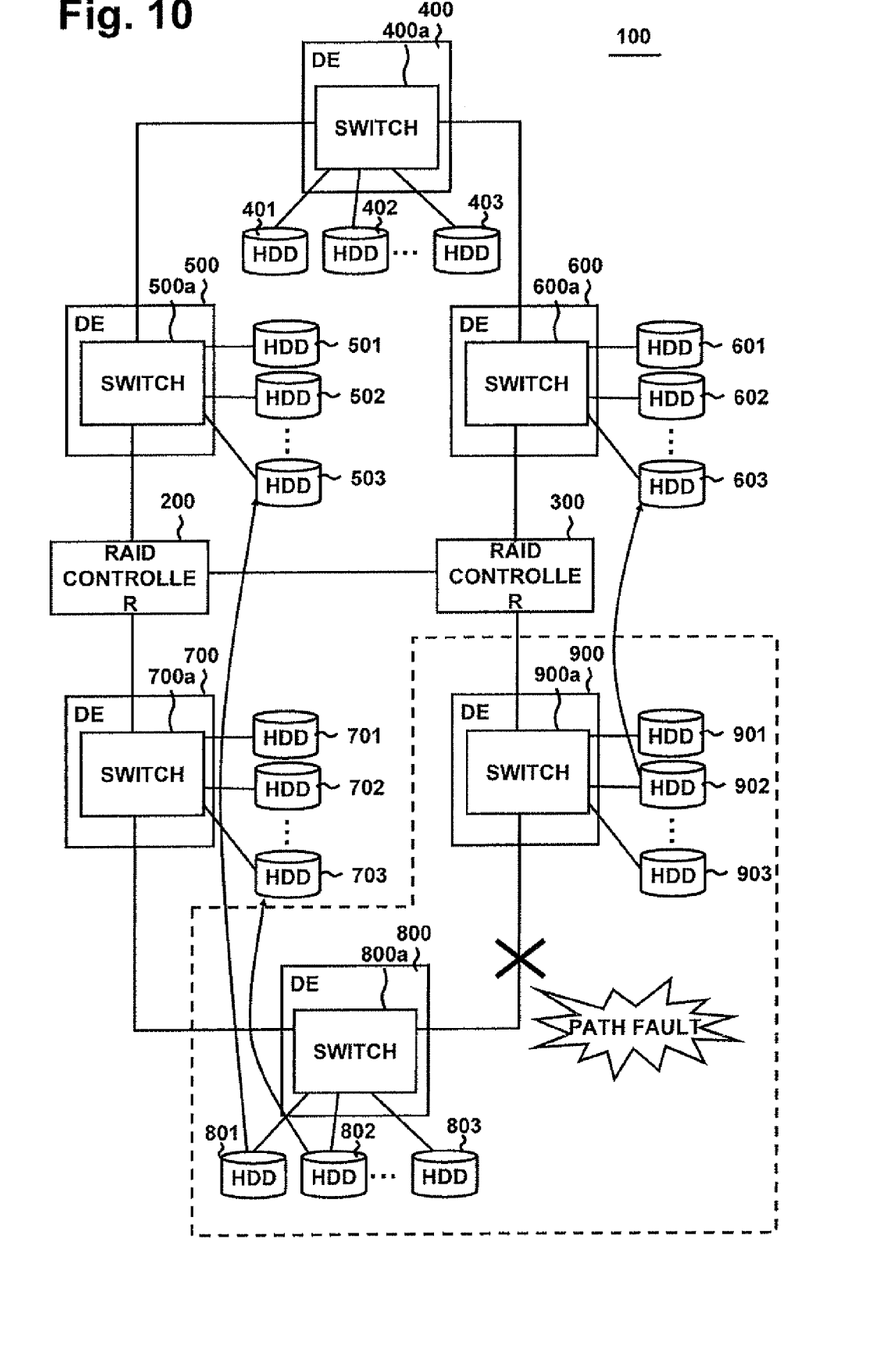
FIG. 10 is a block diagram illustrating paths for data transfer.

While paths for transferring data in the DEs to be isolated have not been particularly explained in the above-described example, the data transfer is performed so that the data do not pass through a path where a path fault was detected. FIG. 10 is a block diagram illustrating paths for data transfer.

When the RAID apparatus 100 is configured as shown in FIG. 10 and a path fault occurs in the path between the DE 800 and the DE 900, data in the DE 800 are transferred to the standby HDDs 503 and 703 of DEs 500 and 700 and data in the DE 900 are transferred to the standby HDD 603 of the DE 600.

Executing the data transfer by using transmission paths that do not have a portion in question, as shown in FIG. 10, makes it possible to perform secure data transfer and also makes it possible to transfer data on the HDDs that belong to the DEs 800 and 900 to be isolated.

(3) System Configuration

Of the processing described in the above-described embodiments, the entire or part of the processing described as being automatically performed can be manually performed or the entire or part of the processing described as being manually performed can be automatically performed by a known method. In addition, the processing procedures, the control procedures, the specific names, and information including various types of data and parameters which are described hereinabove and/or illustrated in the drawings can be arbitrary modified, unless otherwise particularly stated.

The elements (e.g., the RAID controllers 200 and 300 and the switches included in the DEs 400 to 900) of the RAID apparatus 100 illustrated in FIGS. 1, 3, and 5 are merely functional concepts and do not necessarily have to be physically configured as illustrated. That is, the distribution/integration of the devices and units is not limited to the illustrated configurations, and all or some of the devices and units can be functionally or physically distributed/integrated in any combination in accordance with loads, the usage state, and so on. Additionally, all or any of the processing functions of the devices and units can be realized by a CPU (central processing unit) and a program analyzed and executed thereby or can be realized by wired-logic-based hardware.

Figure 11:
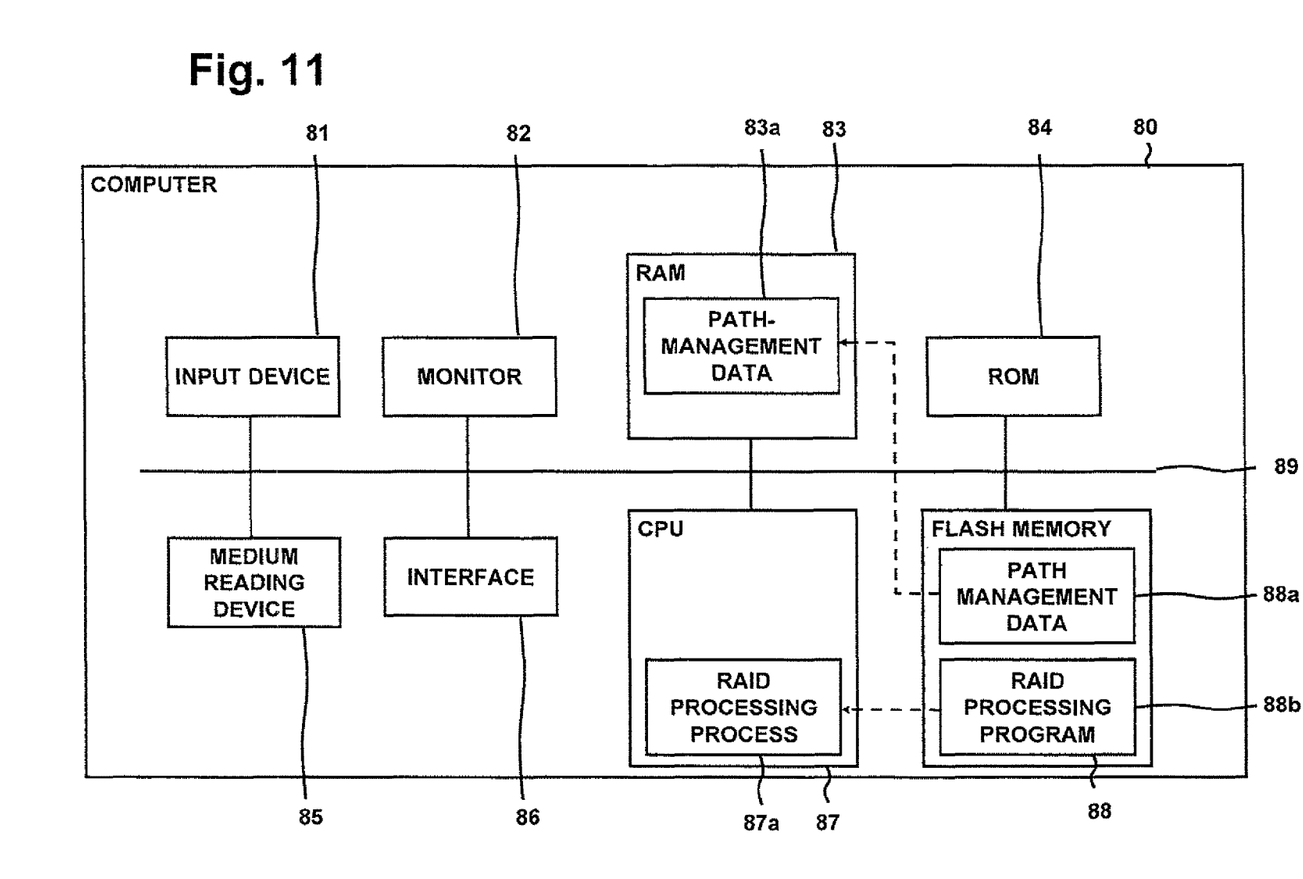
FIG. 11 is a block diagram showing the hardware configuration of a computer that implements the RAID controller according to the first embodiment.

FIG. 11 is a block diagram showing the hardware configuration of a computer that implements the RAID controller according to the first embodiment. As shown in FIG. 11, this computer 80 has a configuration in which an input device 81 for receiving various types of data, a monitor 82, a RAM (random access memory) 83, a ROM (read only memory) 84, a medium reading device 85 for reading data from a storage medium, an interface 86 for transmitting/receiving data to/from another device, a CPU 87, and a flash memory 88 are connected through a bus 89.

The flash memory 88 stores a RAID processing program 88b that provides the same function as those of the RAID controllers 200 and 300. The CPU 87 reads and executes the RAID processing program 88b to thereby start a RAID processing process 87a. This RAID processing process 87a corresponds to the RAID data processing unit 230a, the frame transfer processing unit 230b, the failure detecting unit 230c, and the isolation controlling unit 230d, which are illustrated in FIG. 3.

The flash memory 88 further stores path management data 88a obtained by the input device 81 or the like. The path management data 88a corresponds to the path management data 220a shown in FIG. 3. The CPU 87 reads the path management data 88a stored in the flash memory 88, stores the read path management data 88a in the RAM 83, and switches frame transmission paths by using path-management data 83a stored in the RAM 83.

The RAID processing program 88*b* shown in FIG. 11 does not necessarily have to be pre-stored in the flash memory 88. For example, the RAID processing program 88*b* may be stored on a portable physical medium (e.g., a flexible disk (FD), CD-ROM, DVD disk, magneto-optical disk, or IC card) to be loaded into the computer or a fixed physical medium (e.g., a HDD) provided inside or outside the computer or may be stored on another computer (or a server) or the like connected to the computer through a public line, the Internet, a LAN (local area network), or a WAN (wide area network) so that the computer reads the RAID processing program 88*b* therefrom and executes the RAID processing program 88*b*.

As described above, the storage system according to the present invention is advantageously used for a system or the like having multiple storage devices. In particular, the present invention is suitable for a case in which it is necessary to improve the reliability of the entire system by enabling, even if a path fault occurs, access to the storage device(s) connected beyond the path where the path default occurred.

What is claimed is:

1. A storage apparatus comprising:
    a plurality of storage devices configured to store data;
    a pair of control devices configured to control the plurality of storage devices, each control device being connected with another control device;
    a plurality of switches configured to relay data between the control devices and storage devices and being connected with the plurality of storage devices, the plurality of switches being connected between the control devices in series;
    wherein each of the control devices is configured to control the plurality of storage devices according to a process including:
    detecting a fault in the connection between the control devices and the switches, said detecting identifying an address associated with the connection of the detected fault, and
    controlling the access to the storage devices via the switches such that one of the control devices accesses a part of the storage devices via switches located between said one of the control devices and the fault, and said one of the control devices accesses a remainder of the storage devices via a remainder of the switches, respectively, based on the address identified for the fault, and
    wherein one of the control devices controls to transfer data to other storage devices in other switches which are other than the switches directly connected on either side of the fault, the data being stored on the storage devices in the switches which the fault was detected in the connection of, and then one of the control devices isolates the switches electrically.

2. The storage apparatus according to claim 1, wherein one of the control devices instructs to access the remainder of the storage devices via the remainder of the switches.

3. The storage apparatus according to claim 1, wherein one of the control devices detects the fault in the connection of the switches by comparing a voltage of a signal transmitted between the switches with a threshold.

4. The storage apparatus according to claim 1, wherein one of the control devices detects the fault in the connection of the switches based on a check code for a signal transmitted between the switches.

5. The storage apparatus according to claim 1, wherein one of the control devices isolates the switches electrically based on a result of the detected fault.

6. A method of controlling a storage apparatus including a pair of control devices, a plurality of storage devices, and a plurality of switches, each control device being connected with another control device, the plurality of switches being connected between the control devices in series, the method comprising:
    detecting a fault in the connection between the control devices and the switches, said detecting identifying an address associated with the connection with the detected fault; and
    controlling access to the storage devices via the switches such that one of the control devices accesses a part of the storage devices via the switches located between said one of the control devices and the fault, and said one of the control devices accesses a remainder of the storage devices via a remainder of the switches, respectively, based on the address identified for the fault, and
    wherein one of the control devices controls to transfer data to the other storage devices in other switches which are other than the switches directly connected on either side of the fault, the data being stored on the storage devices in the switches which the fault was detected in the connection of, and then the control device isolates the switches electrically.

7. The method according to claim 6, wherein one of the control devices detects the fault in the connection of the switches by comparing a voltage of a signal transmitted between the switches with a threshold.

8. The method according to claim 6, wherein the fault in the connection between the control devices and the switches is detected based on a check code for a signal transmitted to and received from the switches.

9. The method according to claim 6, wherein one of the control devices isolates the switches electrically based on a result of the detected fault.

* * * * *